Patented Nov. 24, 1925.

1,563,087

UNITED STATES PATENT OFFICE.

CHARLES W. HOOPER, OF JAMAICA, NEW YORK, ASSIGNOR TO H. A. METZ LABORATORIES, INC., OF NEW YORK, N. Y., A CORPORATION OF NEW YORK.

ANALGESIC AGENT AND METHOD OF PREPARING THE SAME.

No Drawing.  Application filed January 22, 1925.  Serial No. 3,950.

*To all whom it may concern:*

Be it known that I, CHARLES W. HOOPER, a citizen of the United States, and resident of Jamaica, county of Queens, and State of New York have invented certain new and useful Improvements in Analgesic Agents and Methods of Preparing the Same, of which the following is a specification.

My invention relates to improvements in analgesic agents and methods of preparing the same, and more particularly to analgesic agents having a magnesium salt or salts as a base. According to my invention in its preferred form an analgesic agent is obtained with a solution of a magnesium salt which agent is not only stable and sterile but also has great analgesic potency.

The hypodermic and intramuscular injection of magnesium sulphate in 25 to 50 per cent aqueous solution is used extensively as a sedative, analgesic and hypnotic in mental disorders, for the control of the convulsions in tetanus and as a preliminary medication with morphine for surgical operations. If injected in sufficient amount magnesium sulphate is capable of producing analgesia, anesthesia and other inhibitory effects on the central nervous system. I have found that by adding to such an aqueous solution of magnesium sulphate a relatively small amount of an alkamine ester of an aromatic acid such as the monohydrochloride of para-amino-benzoyl-diethyl-amino-ethanol (sometimes called "procaine" and more frequently called "novocaine" and which will hereinafter be referred to as novocaine for the sake of brevity) the potency of the solution is greatly and unexpectedly increased.

The mono-hydrochloride or para-amino-benzoyl-diethyl-amino-ethanol has been used as a local anesthetic. When injected into the tissues it acts directly on the sensory nerves or their terminals and inhibits their conductivity, thus producing a local anesthesia. Heretofore, so far as I am aware, it has not been known to possess any sedative, hypnotic or analgesic properties, also, so far as I am aware, the chemico-physical factors concerned in the preparation of concentrated magnesium sulphate ($MgSO_4$.$7H_2O$) solutions with novocaine have not been known. However I have found by experimentation that it is possible to prepare permanent water solutions containing 10 per cent of novocaine with 40% $MgSO_4$ and also solutions containing 5 per cent of novocaine with 50 per cent $MgSO_4$. This is quite unexpected and remarkable in view of the well known salting out effect which inorganic salts, such as sodium chloride, calcium chloride, etc., have on solutions of novocaine, and of magnesium sulphate, sodium chloride etc., on such organic compounds as urea, the urethanes, etc.

Also, I have found by means of animal experimentation that novocaine acts synergistically with respect to the magnesium sulphate, increasing greatly the analgesic an anesthetic potency of the solution, when injected hypodermically or intramuscularly, without increasing the toxity of the solution. The experiments show that the addition of 2½ per cent of novocaine to a 50 per cent solution of magnesium sulphate increases the efficiency of the solution approximately 50 per cent and that it definitely prolongs the analgesic effect, which is still more remarkable. Two cubic centimeters of this solution is equivalent in therapeutic potency to two cubic centimeters of a 50 per cent magnesium sulphate solution with 0.4 per cent morphine sulphate (⅛ grain of morphine in 2 c. c. solution). Furthermore, I find that when the above described solution is used clinically the novocaine not only definitely increases and prolonges the analgesic effect of the magnesium sulphate and greatly intensifies the therapeutic effect of the solution; but it also entirely prevents the burning sensation complained of by many patients when ordinary hypertonic solutions of magnesium sulphate are injected.

In producing the analgesic solution the proportions may be greatly varied depending upon various conditions to be met etc., but I prefer solutions in which the magnesium sulphate varies from 25% to 50% and the novocaine from 1% to 10%. Thus good results have been obtained in which the proportions were (1) magnesium sulphate ($MgSO_4$.$7H_2O$), 50 grams, novocaine 2.5 grams and distilled water in sufficient quantity to make 100 cubic centimeters, (2) magnesium sulphate ($MgSO_4$.$7H_2O$), 25 grams, novocaine 1.25 grams, and distilled water a sufficient quantity to make 100 cubic centimeters.

In order to prevent infection at the site of the hypodermic or intramuscular injection it is essential that the solutions be sterile. In testing the solutions bacteriologically I have found that they are good culture media for certain resistant bacteria and molds and that contaminated solutions are not sterilized by boiling for two hours (100°C.) even under slight pressure.

I find however that sterility may be insured by filling glass ampules of the desired volume with the freshly prepared solution, then promptly sealing off the ampules with the aid of a blow pipe and then submerging the ampules in boiling water for 15 to 30 minutes on three successive days, or autoclaving them in a live steam sterilizer for 30 minutes at 20 pounds steam pressure. This procedure has been found most practical because it prevents any loss by evaporation and also any accidental contamination after sterilization.

I have thoroughly tested these analgesic solutions for sterility and stability. Relatively old ampules thereof are still water clear and have retained their full analgesic potency. Thus I am able to produce sterile stable ready to use stock in trade aqueous solutions of magnesium sulphate or its equivalent with novocaine or its equivalent for analgesic purposes, which solutions are far superior to the magnesium sulphate solutions heretofore employed and which do not produce any pain when injected hypodermically or intramuscularly.

Other alkamine esters of aromatic acids such as the hydrochloride of diethyl-amino-propyl-cinnamate and the sulphate of para-amino-benzoyl-gamma-dinormal-butyl-amino-propanol may be used in place of the novocaine and other magnesium salts such as magnesium chloride may be used in place of the magnesium sulphate, therefore while I have described my improvements in great detail and with respect to preferred embodiments thereof, I do not desire to be limited to such details or embodiments since many changes and modifications may be made and the invention embodied in widely different forms without departing from the spirit or scope of the invention in its broader aspects. Hence I desire to cover all modifications and forms coming within the language or scope of any one or more of the appended claims.

I claim:

1. An analgesic agent comprising a sterile aqueous solution of magnesium sulphate containing a relatively small amount of novocaine.

2. An analgesic agent comprising a solution of magnesium salt containing an alkamine ester of an aromatic acid.

3. An analgesic agent comprising an aqueous solution of magnesium sulphate having therein a relatively small amount of an alkamine ester of an aromatic acid.

4. An analgesic agent comprising a sterile solution containing a salt of magnesium and a relatively small amount of novocaine.

5. A sealed ampule containing a sterile aqueous solution of a magnesium salt having therein a relatively small amount of an alkamine ester of an aromatic acid.

6. The method of preparing an analgesic agent which consists in filling a glass ampule with a solution of magnesium sulphate having therein a relatively small amount of novocaine, then sealing off the ampule and heating the sealed ampule.

7. The method of preparing an analgesic agent which consists in filling an ampule with a solution of a salt of magnesium containing a relatively small amount of an alkamine ester of an aromatic acid, then sealing of the ampule and sterilizing by heating the sealed ampule.

8. The method of preparing an analgesic agent which consists in filling an ampule with a solution of a salt of megnesium containing a relatively small amount of an alkamine ester of an aromatic acid, then sealing of the ampule and sterilizing by heating the sealed ampule in live steam under pressure.

In testimony whereof I have signed my name to this specification.

CHARLES W. HOOPER.